United States Patent
Han

(10) Patent No.: US 10,872,070 B2
(45) Date of Patent: *Dec. 22, 2020

(54) DISTRIBUTED DATA PROCESSING

(71) Applicant: Advanced New Technologies Co., Ltd., George Town (KY)

(72) Inventor: Min Han, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,641

(22) Filed: Feb. 25, 2020

(65) Prior Publication Data

US 2020/0192882 A1     Jun. 18, 2020

Related U.S. Application Data

(63) Continuation of application No. 15/797,537, filed on Oct. 30, 2017, now Pat. No. 10,592,491, which is a
(Continued)

(30) Foreign Application Priority Data

May 4, 2015     (CN) .......................... 2015 1 0222356

(51) Int. Cl.
    *G06F 16/00*     (2019.01)
    *G06F 16/22*     (2019.01)
    (Continued)

(52) U.S. Cl.
    CPC ............ *G06F 16/2272* (2019.01); *G06F 7/08* (2013.01); *G06F 16/27* (2019.01)

(58) Field of Classification Search
    None
    See application file for complete search history.

(56) References Cited

U.S. PATENT DOCUMENTS 7,756,919 B1   7/2010  Dean et al.
9,740,706 B2   8/2017  Cramer et al.
(Continued)

FOREIGN PATENT DOCUMENTS

CN     101645067     2/2010
CN     102236581     11/2011
(Continued)

OTHER PUBLICATIONS

Nakada et al, "Improving MapReduce implementation of PrefixSpan method", IEICE Technical Report: The Institute of Electronics, Information and Communication Engineers, Oct. 5, 2012, 10 pages (with English abstract).

(Continued)

*Primary Examiner* — Bai D Vu
(74) *Attorney, Agent, or Firm* — Fish & Richardson P.C.

(57) ABSTRACT

A method for distributed data processing includes selecting a first number of candidate key-value pairs from input key-value pairs stored in a distributed file system and identifying an invocation frequency for each of the first number of candidate key-value pairs in a predetermined period of time. The invocation frequency is a number of times the corresponding candidate key-value pair was called by a service system in the predetermined period of time. The method further includes selecting a second number of hot key-value pairs from the candidate key-value pairs based on the invocation frequencies of the candidate key-value pairs, mapping the second number of hot key-value pairs to intermediate key-value pairs, and reducing the intermediate key-value pairs to resultant key-value pairs to be called by the service system.

20 Claims, 2 Drawing Sheets

Related U.S. Application Data continuation of application No. PCT/CN2016/079812, filed on Apr. 21, 2016.

(51) Int. Cl.
*G06F 16/27* (2019.01)
*G06F 7/08* (2006.01)

(56) References Cited

U.S. PATENT DOCUMENTS

| | | |
|---|---|---|
| 10,592,491 B2 | 3/2020 | Han |
| 2009/0313635 A1 | 12/2009 | Dasdan |
| 2011/0208947 A1 | 8/2011 | Lin et al. |
| 2012/0304186 A1 | 11/2012 | Balmin et al. |
| 2013/0254196 A1 | 9/2013 | Babu et al. |
| 2015/0074115 A1 | 3/2015 | Vasu et al. |
| 2018/0046658 A1 | 2/2018 | Han |

FOREIGN PATENT DOCUMENTS

| | | |
|---|---|---|
| CN | 102314336 | 1/2012 |
| CN | 102388374 | 3/2012 |
| CN | 102456031 | 5/2012 |
| CN | 103838844 | 6/2014 |
| CN | 103995882 | 8/2014 |
| CN | 104077297 | 10/2014 |
| CN | 104142950 | 11/2014 |
| CN | 104331464 | 2/2015 |
| CN | 104536830 | 4/2015 |
| CN | 107193500 | 9/2017 |
| JP | 2010092222 | 4/2010 |
| JP | 2012511784 | 5/2012 |
| JP | 2012160013 | 8/2012 |
| JP | 2012247979 | 12/2012 |
| JP | 2013508873 | 3/2013 |
| JP | 2013140510 | 7/2013 |
| TW | I461929 | 11/2014 |
| TW | I521359 | 2/2016 |
| TW | 1610166 | 1/2018 |
| WO | WO 2013051131 | 4/2013 |
| WO | WO 2013153620 | 10/2013 |
| WO | WO 2014020735 | 2/2014 |
| WO | WO 2014117295 | 8/2014 |

OTHER PUBLICATIONS

Brito et al.; Scalable and Low-Latency Data Processing with Stream MapReduce. proc. of IEEE CloudCom'11, Dec. 1, 2011, pp. 1-11.
Crosby et al., "BlockChain Technology: Beyond Bitcoin," Sutardja Center for Entrepreneurship & Technology Technical Report, Oct. 16, 2015, 35 pages.
European Extended Search Report in EURopean Application No. 16789273.6, dated Sep. 19, 2018, 7 pages.
International Preliminary Report on Patentability in International Application No. PCT/CN2016/079812, dated Nov. 7, 2017, 9 pages (with English translation).
International Search Report issued by the International Searching Authority in International Application No. PCT/CN2016/079812 dated Jun. 30, 2016; 8 pages.
Nakamoto, "Bitcoin: A Peer-to-Peer Electronic Cash System," www.bitcoin.org, 2005, 9 pages.
Search Report and Written Opinion of the Intellectual Property Office of Singapore issued in Singapore Application No. 11201708917S dated Aug. 14, 2018; 11 pages.

DISTRIBUTED DATA PROCESSING

This application is a continuation of U.S. application Ser. No. 15/797,537, filed on Oct. 30, 2017, which claims priority to PCT Application No. PCT/CN2016/079812, filed on Apr. 21, 2016, which claims priority to Chinese Patent Application No. 201510222356.4, filed on May 4, 2015, the entire contents of each are hereby incorporated by reference.

TECHNICAL FIELD

This disclosure relates to data processing and, more particularly, to distributed processing of big data.

BACKGROUND

With the advancement of computer technology, larger amounts of data need to be processed to perform particular operations. A single computer may not be able to handle large-scale data processing. Some technologies use a plurality of computers to form a distributed system to store and to process data in parallel.

For example, HADOOP is a distributed data processing system that can use a large number of inexpensive computers to form a computer cluster. The HADOOP system can split files into blocks and distribute the blocks across computers in the computer cluster. As such, the less-expensive cluster of computers can be used to replace an expensive, high-speed computing and storage system or device. HADOOP can include a storage part, known as HADOOP Distributed File System (HDFS), and a processing part which is a MAPREDUCE software framework or programming model. The HDFS can be used for data management and storage. The MAPREDUCE software framework includes a mapper and a reducer. The mapper can map input key/value pairs to a set of intermediate key/value pairs. The reducer can reduce the set of intermediate values to a smaller set of values.

Using distributed data processing, a large-scale data processing task can be split into smaller tasks to be executed in parallel by a large number of computers. However, the total amount of computing resources needed and the data processing amount are not reduced, which may not satisfy efficiency requirements for time-sensitive data processing tasks.

SUMMARY

The present disclosure describes data processing in a distributed system.

In an implementation, a first number of candidate key-value pairs are selected from input key-value pairs stored in a distributed file system. An invocation frequency is identified for each of the first number of candidate key-value pairs in a predetermined period of time, wherein the invocation frequency is a number of times the corresponding candidate key-value pair was called by a service system in the predetermined period of time. A second number of hot key-value pairs are selected from the candidate key-value pairs based on the invocation frequencies of the candidate key-value pairs. The second number of hot key-value pairs are mapped to intermediate key-value pairs, and the intermediate key-value pairs are reduced to resultant key-value pairs to be called by the service system.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to reduce the amount of data that need to be processed in real-time, prioritize more valuable data, increase data processing efficiency, and improve user experience. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

Like reference numbers and designations in the various drawings indicate like elements.

DETAILED DESCRIPTION

The following detailed description describes data processing techniques using distributed systems, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In data processing, distributed systems, such as HADOOP, can provide background data processing for foreground services such as web search, social media, and online payment. The data processed by the distributed systems are often formatted as key-value pairs (KVPs) (for example, "<key, value>"). For certain services, the amount of KVPs that need to be processed can be very large. Therefore, some types of background data processing methods may not be suitable for certain time-sensitive services. The present disclosure describes techniques that allow a distributed system to select and pre-process "hot" KVPs. For the purposes of this disclosure, "hot" KVPs can be defined as KVPs that are more likely to be called by a service system based on, for example, a service type, key type, or historical invocation frequency. Pre-processed hot KVPs are ready to be called by the service system without further processing. Only non-hot KVPs may need to be processed when called, which can significantly reduce overall data processing time.

Figure 1:
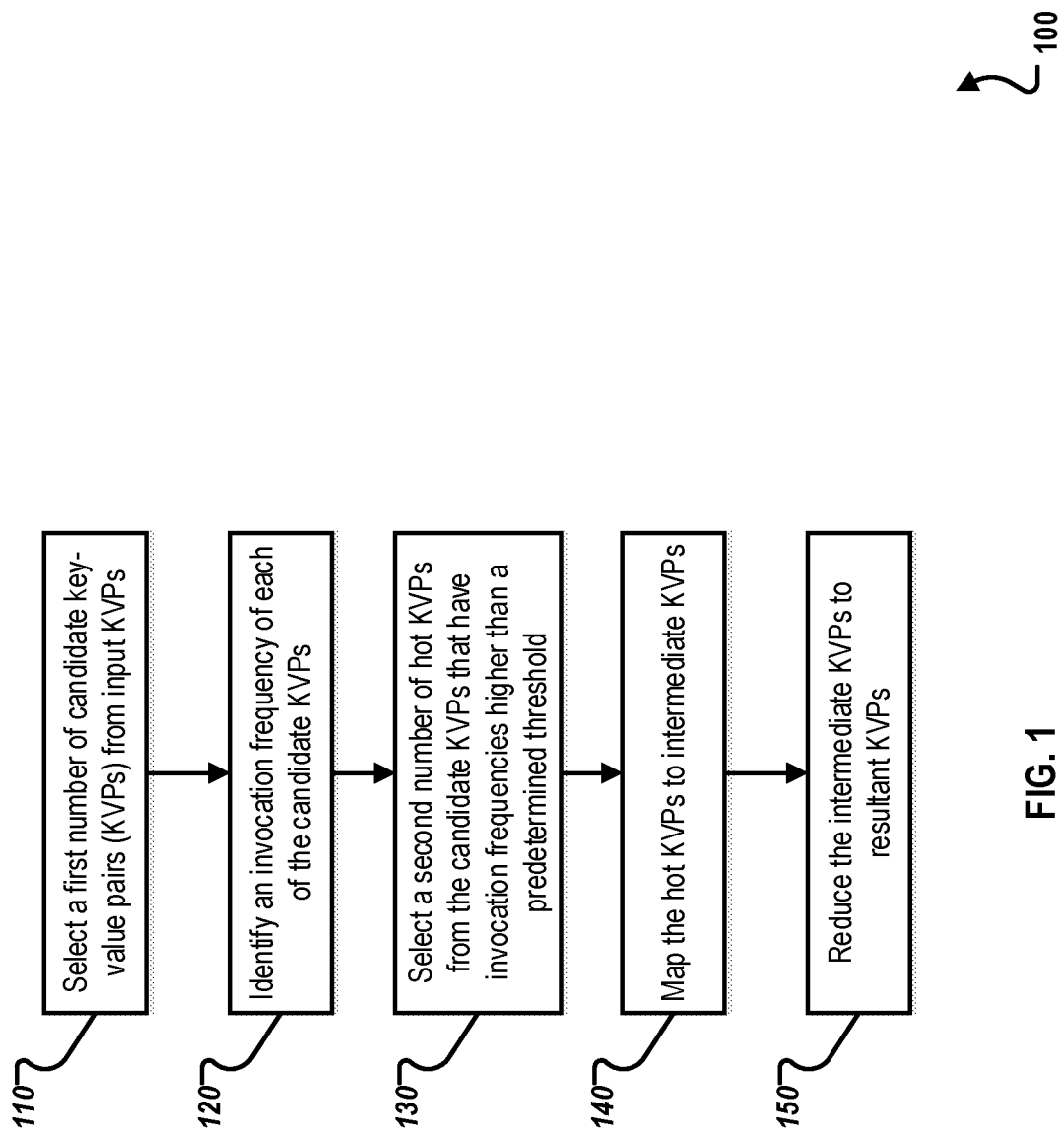
FIG. 1 is a flowchart illustrating an example of a method for data processing using a distributed system, according to an implementation of the present disclosure.

FIG. 1 is a flowchart illustrating an example of a method 100 for data processing using a distributed system, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some implementations, various steps of method 100 can be run in parallel, in combination, in loops, or in any order. The example method 100 can be performed by a distributed system that comprises a plurality of computers. The distributed system can include a distributed file system for data storage and a distributed data processing model for large-scale data processing. For example, the distributed system can be a HADOOP system which includes a HADOOP distributed file system that stores files across multiple computers, and a MAPREDUCE software framework that splits the files into blocks and process them in parallel using the multiple computers.

At 110, the distributed system selects a number of candidate KVPs from input KVPs. In a distributed system, data in the file system can be mapped and stored as KVPs. A KVP can include a "key" that can characterize a type or attribute of the data and a "value" that can represent the content of the data. The formats of the "value" can include list, hash table, string, numeric, Boolean, ordered list, null, etc. For example, the key-value pair, <"name", "John Smith">, has the key "name," which represents the type of data, and the value "John Smith," which represents the content of the key type.

The MAPREDUCE software framework can use a map script to take the data and map it to KVPs as input to a user-specified reduce script. The reduce script takes the KVPs and "reduce" them according to reduce script instructions to produce output data. For example, assume that an online merchant has a large quantity of orders to be processed. The map script can divide the orders into KVPs and distribute to available servers to process. The KVPs can be dynamically divided and distributed based on the volume to be processed and the available computational resources of the available servers. After processing, the reduce script can gather the processing results from the available servers.

In some cases, a large number of input KVPs are generated by the map script, the distributed system can select a particular portion of the input KVPs to process for efficiency. The candidate KVPs can be selected randomly, from all the KVPs output by the map script. The number of candidate KVPs to be selected can be based on, for example, a service type, historical data, or dynamically-determined based on a computer algorithm.

In some cases, before selecting the candidate KVPs, the data system can set one or more service type conditions of the KVPs, and then select candidate KVPs from the KVPs that satisfy the one or more service type conditions. The service type conditions can be determined based on, for example, historical data or dynamically adjusted. KVPs of certain key types can be related to a specific service type. For example, a push notification service can be related to key types such as "age" of the service user. As such, push notifications for wedding gifts can be deemed irrelevant to a recipient under the age of sixteen. Accordingly, push notification services may function better when the one or more service type conditions of the KVPs include a particular key type. Similarly, the push notification service can also be related to key types (such as, "gender" and "profession"). Therefore, the one or more service type conditions for push notification service can select KVPs with certain key types (such as, "age," "gender," and "profession"). Selecting KVPs that satisfy the service type conditions as candidate KVPs can reduce an amount of data processing amount and improve overall data processing efficiency to provide a better user experience. From 110, method 100 proceeds to 120.

At 120, the distributed system identifies an invocation frequency for each of the candidate KVPs. The invocation frequency indicates the number of times a candidate KVP is called in a predetermined time-period. From 120, method 100 proceeds to 130.

At 130, the distributed system selects a number of hot KVPs from the candidate KVPs that have invocation frequencies higher than a predetermined threshold. As such, the hot KVPs can be the KVPs that are more likely to be called by the service system than other KVPs. Pre-processing the hot-KVPs can improve the overall efficiency of data processing. In some cases, the number of hot KVPs to be selected can be based, for example, on a service type, historical data, or dynamically determined, based on a computer algorithm, such as a machine learning algorithm, a first-in-fist-out algorithm, or fixed configuration. In some cases, the distributed system can sort the candidate KVPs based on the invocation frequency of each of the candidate KVPs and select the hot KVPs based on the sorted candidate KVPs.

In some cases, the selection of hot KVPs can further be optimized based on machine learning algorithms. Using machine algorithms can further streamline the hot KVP selection and improve the overall efficiency of distributed data processing. Various machine learning algorithms can be used, based on, for example, the types of services provided by the distributed system. A machine-learning-based hot KVP selection process can include the following high-level steps: (1) determine a distribution of the invocation frequencies of the candidate KVPs; (2) determine one or more key value intervals as filtering conditions for selecting the hot KVPs, based on a predetermined threshold; and (3) select candidate KVPs with values in the key value interval as hot KVPs.

As an example, using a cluster analysis algorithm for a push notification service, when the distributed system determines that the push notification service is over a predetermined threshold (for example, fifty-percent), it can select KVPs that have a particular key type (for example, "age") for processing. The distributed system can then determine a distribution of the invocation frequencies of the KVPs with the particular key type and use a clustering algorithm (for example, K-means) to categorize candidate KVPs to key-value intervals for use in selecting hot KVPs.

The sample data-set for the clustering algorithm can include the candidate KVPs of the particular key type and their corresponding invocation frequencies. For example, the K-means algorithm can divide the invocation frequencies to m frequency intervals for frequency clustering and "age" values into n age intervals for age value clustering. The algorithm can be performed as follows:

At step 1: the algorithm can calculate a center frequency for each of the m frequency intervals. From step 1, the algorithm proceeds to step 2.

At step 2: in iteration k, (k=2, . . . , i, where i represents the number of iterations on which the frequency clustering can converge), the algorithm can determine the distance (frequency difference) between each invocation frequency and each center frequency, and assign the corresponding candidate KVP to the frequency interval that it has the closest center point (that is, assign a candidate KVP to a frequency interval so that the frequency difference between the candidate KVP's invocation frequency and the frequency interval's center frequency is the smallest). From step 2, the algorithm proceeds to step 3.

At step 3: the algorithm can calculate, for each of the m frequency intervals, an average value of invocation frequencies of candidate KVPs assigned to the frequency interval. From step 3, the algorithm proceeds to step 4.

At step 4: the algorithm can compare, for each of the m frequency intervals, the average value of invocation frequencies with the center frequency updated in iteration k−1. If for all frequency intervals, the average values and the center frequencies are the same, the frequency clustering converges and the algorithm proceeds to age value clustering at step 5. Otherwise, the algorithm returns to step 2 until the frequency clustering algorithm converges. From step 4, the algorithm proceeds to step 5.

At step 5: the algorithm can calculate a center age for each of the n age intervals. From step 5, the algorithm proceeds to step 6.

At step 6: in iteration l, (l=2, . . . , q, where q represents the number of iterations that the age value clustering can converge), the algorithm can determine the distance (age difference) between each age value and each center frequency, and assign the corresponding candidate KVP to the age interval that has the closest center point (that is, assign a candidate KVP to an age interval for which the age difference between the candidate KVP's age value and the age interval's center age is the smallest). From step 6, the algorithm proceeds to step 7.

At step 7: the algorithm can calculate, for each of the n age intervals, an average age value of candidate KVPs assigned to the frequency interval. From step 7, the algorithm proceeds to step 8.

At step 8: the algorithm can compare, for each of the n age intervals, the average age value with the center age updated in iteration l−1. If for all age intervals, the average age values and the center ages are the same, the age value clustering converges and the algorithm ends. Otherwise, the algorithm returns to step 5 until the age value clustering algorithm converges.

After performing the clustering analysis algorithm, the clustering pattern of candidate KVPs' invocation frequencies over age intervals can be revealed. One or more age intervals that have candidate KVPs with total invocation frequency greater than a predetermined threshold can be selected as a filtering condition to select the hot KVPs. For example, one filtering condition can be that KVPs with age values between twelve and eighteen years of age are used as candidate KVPs to select hot KVPs, if the machine learning algorithm determines that candidate KVPs within this age interval have a total invocation frequency greater than a predetermined frequency threshold.

In some cases, when KVPs with two key types are called by the same service system with the same service type code, the union of key value intervals of the two types of KVPs can be used as a filtering condition for selecting the hot KVPs. For example, assume that a distributed system has determined that KVPs for "age" key type and "profession" key types are highly correlated to a push notification service, a machine learning algorithm can then determine filtering conditions for both the "age" key type and the "profession" key type. If the machine learning algorithm determines that KVPs with the "age" value interval between twenty to thirty years old and "profession" interval of "computer science" have invocation frequencies higher than a predetermined threshold, the distributed system can select KVPs in such intervals as hot KVP data-set. In some cases, a distributed system can determine more than one KVP data-set using machine learning. The distributed system can then dynamically select hot KVP data-sets by comparing the invocation frequency of KVP data-sets with a predetermined threshold, and select the KVP data-sets with a total invocation frequency greater than the predetermined threshold as hot KVP data-sets.

In some cases, a data processing priority can be determined for the KVP data-sets. The priority can be calculated based on weighted sum of KVPs of the KVP data-set. For example, when a KVP is called, the priority of the KVP data-set that includes the KVP can be increased by one unit. When a KVP data-set has priority over the others, it can be preferred to be selected as hot KVP data-set to improve data processing efficiency. From 130, method 100 proceeds to 140.

At 140, the example method 100 maps the hot KVPs to intermediate KVPs. In some cases, a client-side client (for example, JobClient) can send a MAPREDUCE job to a work scheduler, create a new job instance, and call a submitJob function. After receiving the submitJob function call, the work scheduler can initialize a task. The work scheduler can create the task and assign the task code. The work scheduler can then assign task to a task scheduler. The task scheduler can perform the task after the task is assigned to it. During the mapping process, the task scheduler can call a Map function to map the hot KVPs to intermediate KVPs and output the intermediate KVPs according to an order of their key values. From 140, method 100 proceeds to 150.

At 150, the example process 100 reduces the intermediate KVPs to resultant KVPs. In some cases, the task scheduler can call a Reduce function to process the intermediate KVPs for generating the resultant KVPs. The work scheduler can store the resultant KVPs to the HDFS for invocation by the distributed system after the tasks are successfully performed by the task scheduler. After 150, method 100 ends.

Using the example method 100, the hot KVPs are pre-processed by the MAPREDUCE software framework and are ready to be directly called by the service system. The non-hot KVPS can be processed in real-time by the MAPREDUCE software framework when called by the service system. Because the hot KVPs that may more likely be called by the service system are pre-processed, the amount of real-time data processing by the system can be reduced and the efficiency of the system can be improved.

In some cases, hot KVPs can be selected from the intermediate KVPs mapped by the Map function from input KVPs. That is, MAPREDUCE software framework can use the Map function to map the input KVPs to intermediate KVPs, and then select hot KVPs from the mapped intermediate KVPs. The selection of hot KVPs can be similar to discussed steps 110-130. After the hot KVPs are selected, the MAPREDUCE software framework can use the Reduce function to reduce the hot KVPs to resultant KVPs as discussed in the description of step 150 of FIG. 1.

Figure 2:
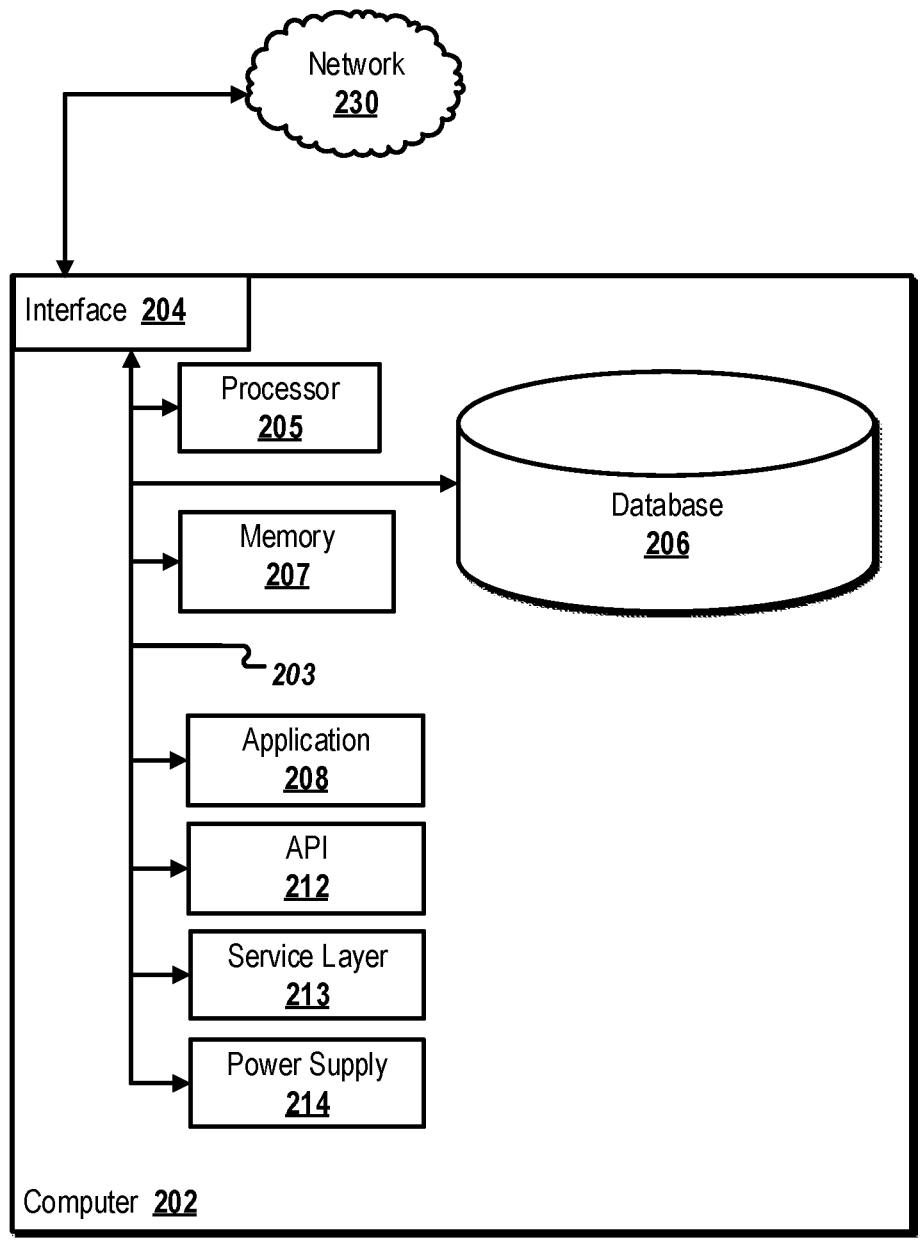
FIG. 2 is a block diagram illustrating an example computer system used to provide computational functionalities associated with described algorithms, methods, functions, processes, flows, and procedures, as described in the instant disclosure, according to an implementation of the present disclosure.

FIG. 2 is a block diagram illustrating an example of a computer-implemented system 200 used to provide computational functionalities associated with described algorithms, methods, functions, processes, flows, and procedures, according to an implementation of the present disclosure. In the illustrated implementation, system 200 includes a computer 202 and a network 230.

The illustrated computer 202 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 202 can include an input device, such as a keypad, keyboard, touch screen, another input device, or a combination of input devices that can accept user information, and an output device that conveys information associated with the operation of the computer 202, including digital data, visual, audio, another type of information, or a combination of types of information, on a graphical-type user interface (UI) (or GUI) or other UI.

The computer 202 can serve in a role in a distributed computing system as a client, network component, a server, a database or another persistency, another role, or a combination of roles for performing the subject matter described in the present disclosure. The illustrated computer 202 is communicably coupled with a network 230. In some implementations, one or more components of the computer 202 can be configured to operate within an environment, including cloud-computing-based, local, global, another environment, or a combination of environments.

At a high level, the computer 202 is an electronic computing device operable to receive, transmit, process, store, or manage data and information associated with the described subject matter. According to some implementations, the computer 202 can also include or be communicably coupled with a server, including an application server, e-mail server, web server, caching server, streaming data server, another server, or a combination of servers.

The computer 202 can receive requests over network 230 (for example, from a client software application executing on another computer 202) and respond to the received requests by processing the received requests using a software application or a combination of software applications. In addition, requests can also be sent to the computer 202 from internal users (for example, from a command console or by another internal access method), external or third-parties, or other entities, individuals, systems, or computers.

Each of the components of the computer 202 can communicate using a system bus 203. In some implementations, any or all of the components of the computer 202, including hardware, software, or a combination of hardware and software, can interface over the system bus 203 using an application programming interface (API) 212, a service layer 213, or a combination of the API 212 and service layer 213. The API 212 can include specifications for routines, data structures, and object classes. The API 212 can be either computer-language independent or dependent and refer to a complete interface, a single function, or even a set of APIs. The service layer 213 provides software services to the computer 202 or other components (whether illustrated or not) that are communicably coupled to the computer 202. The functionality of the computer 202 can be accessible for all service consumers using this service layer. Software services, such as those provided by the service layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 202, alternative implementations can illustrate the API 212 or the service layer 213 as stand-alone components in relation to other components of the computer 202 or other components (whether illustrated or not) that are communicably coupled to the computer 202. Moreover, any or all parts of the API 212 or the service layer 213 can be implemented as a child or a sub-module of another software module, enterprise application, or hardware module without departing from the scope of the present disclosure.

The computer 202 includes an interface 204. Although illustrated as a single interface 204 in FIG. 2, two or more interfaces 204 can be used according to particular needs, desires, or particular implementations of the computer 202. The interface 204 is used by the computer 202 for communicating with another computing system (whether illustrated or not) that is communicatively linked to the network 230 in a distributed environment. Generally, the interface 204 is operable to communicate with the network 230 and includes logic encoded in software, hardware, or a combination of software and hardware. More specifically, the interface 204 can include software supporting one or more communication protocols associated with communications such that the network 230 or interface's hardware is operable to communicate physical signals within and outside of the illustrated computer 202.

The computer 202 includes a processor 205. Although illustrated as a single processor 205 in FIG. 2, two or more processors can be used according to particular needs, desires, or particular implementations of the computer 202. Generally, the processor 205 executes instructions and manipulates data to perform the operations of the computer 202 and any algorithms, methods, functions, processes, flows, and procedures as described in the present disclosure.

The computer 202 also includes a database 206 that can hold data for the computer 202, another component communicatively linked to the network 230 (whether illustrated or not), or a combination of the computer 202 and another component. For example, database 206 can be an in-memory, conventional, or another type of database storing data consistent with the present disclosure. In some implementations, database 206 can be a combination of two or more different database types (for example, a hybrid in-memory and conventional database) according to particular needs, desires, or particular implementations of the computer 202 and the described functionality. Although illustrated as a single database 206 in FIG. 2, two or more databases of similar or differing types can be used according to particular needs, desires, or particular implementations of the computer 202 and the described functionality. While database 206 is illustrated as an integral component of the computer 202, in alternative implementations, database 206 can be external to the computer 202.

The computer 202 also includes a memory 207 that can hold data for the computer 202, another component or components communicatively linked to the network 230 (whether illustrated or not), or a combination of the computer 202 and another component. Memory 207 can store any data consistent with the present disclosure. In some implementations, memory 207 can be a combination of two or more different types of memory (for example, a combination of semiconductor and magnetic storage) according to particular needs, desires, or particular implementations of the computer 202 and the described functionality. Although illustrated as a single memory 207 in FIG. 2, two or more memories 207 or similar or differing types can be used according to particular needs, desires, or particular implementations of the computer 202 and the described functionality. While memory 207 is illustrated as an integral component of the computer 202, in alternative implementations, memory 207 can be external to the computer 202.

The application 208 is an algorithmic software engine providing functionality according to particular needs, desires, or particular implementations of the computer 202, particularly with respect to functionality described in the present disclosure. For example, application 208 can serve as one or more components, modules, or applications. Further, although illustrated as a single application 208, the application 208 can be implemented as multiple applications 208 on the computer 202. In addition, although illustrated as integral to the computer 202, in alternative implementations, the application 208 can be external to the computer 202.

The computer 202 can also include a power supply 214. The power supply 214 can include a rechargeable or non-rechargeable battery that can be configured to be either user- or non-user-replaceable. In some implementations, the power supply 214 can include power-conversion or management circuits (including recharging, standby, or another power management functionality). In some implementations, the power-supply 214 can include a power plug to allow the computer 202 to be plugged into a wall socket or another power source to, for example, power the computer 202 or recharge a rechargeable battery.

There can be any number of computers 202 associated with, or external to, a computer system containing computer 202, each computer 202 communicating over network 230. Further, the term "client," "user," or other appropriate terminology can be used interchangeably, as appropriate, without departing from the scope of the present disclosure. Moreover, the present disclosure contemplates that many users can use one computer 202, or that one user can use multiple computers 202.

Described implementations of the subject matter can include one or more features, alone or in combination.

For example, in a first implementation, a computer-implemented method, comprising: selecting a first number of candidate key-value pairs from input key-value pairs stored in a distributed file system; identifying an invocation frequency for each of the first number of candidate key-value pairs in a predetermined period of time, wherein the invocation frequency is a number of times the corresponding candidate key-value pair was called by a service system in the predetermined period of time; selecting a second number of hot key-value pairs from the candidate key-value pairs based on the invocation frequencies of the candidate key-value pairs; mapping the second number of hot key-value pairs to intermediate key-value pairs; and reducing the intermediate key-value pairs to resultant key-value pairs to be called by the service system.

The foregoing and other described implementations can each, optionally, include one or more of the following features:

A first feature, combinable with any of the following features, wherein the first number of candidate key-value pairs is randomly selected from the input key-value pairs.

A second feature, combinable with any of the previous or following features, wherein selecting a first number of candidate key-value pairs further comprises: determining a service type of a service provided by the service system; determining one or more key types based on the service type; and selecting key-value pairs with the determined one or more key types as the first number of candidate key-value pairs.

A third feature, combinable with any of the previous or following features, wherein selecting a second number of hot key-value pairs further comprises: sorting the candidate key-value pairs based on their corresponding invocation frequencies; and selecting the second number of hot key-value pairs based on the sorted candidate key-value pairs that have invocation frequencies higher than a predetermined threshold.

A fourth feature, combinable with any of the previous or following features, wherein selecting a second number of hot key-value pairs further comprises: determining a distribution of the invocation frequencies of the candidate key-value pairs; determining one or more key value intervals as filtering conditions for selecting the hot key-value pairs based on a predetermined frequency threshold; and selecting candidate key-value pairs with key values within the key value interval as hot key-value pairs.

A fifth feature, combinable with any of the previous or following features, wherein the one or more key value intervals are related to key values of the same key type and the corresponding key-value pairs have a total invocation frequency greater than the predetermined frequency threshold.

A sixth feature, combinable with any of the previous or following features, wherein the one or more key value intervals are related to key values of one or more key types and the corresponding key-value pairs have a total invocation frequency greater than the predetermined frequency threshold.

A seventh feature, combinable with any of the previous or following features, further comprising: mapping non-hot key-value pairs to intermediate key-value pairs when the non-hot key-value pairs are called by the service system; and reducing the intermediate key-value pairs to resultant key-value pairs.

In a second implementation, a non-transitory, computer-readable medium storing one or more instructions executable by a computer system to perform operations comprising: selecting a first number of candidate key-value pairs from input key-value pairs stored in a distributed file system; identifying an invocation frequency for each of the first number of candidate key-value pairs in a predetermined period of time, wherein the invocation frequency is a number of times the corresponding candidate key-value pair was called by a service system in the predetermined period of time; selecting a second number of hot key-value pairs from the candidate key-value pairs based on the invocation frequencies of the candidate key-value pairs; mapping the second number of hot key-value pairs to intermediate key-value pairs; and reducing the intermediate key-value pairs to resultant key-value pairs to be called by the service system.

The foregoing and other described implementations can each, optionally, include one or more of the following features:

A first feature, combinable with any of the following features, wherein the first number of candidate key-value pairs is randomly selected from the input key-value pairs.

A second feature, combinable with any of the previous or following features, wherein selecting a first number of candidate key-value pairs further comprises: determining a service type of a service provided by the service system; determining one or more key types based on the service type; and selecting key-value pairs with the determined one or more key types as the first number of candidate key-value pairs.

A third feature, combinable with any of the previous or following features, wherein selecting a second number of hot key-value pairs further comprises: sorting the candidate key-value pairs based on their corresponding invocation frequencies; and selecting the second number of hot key-value pairs based on the sorted candidate key-value pairs that have invocation frequencies higher than a predetermined threshold.

A fourth feature, combinable with any of the previous or following features, wherein selecting a second number of hot key-value pairs further comprises: determining a distribution of the invocation frequencies of the candidate key-value pairs; determining one or more key value intervals as filtering conditions for selecting the hot key-value pairs based on a predetermined frequency threshold; and selecting candidate key-value pairs with key values within the key value interval as hot key-value pairs.

A fifth feature, combinable with any of the previous or following features, wherein the one or more key value intervals are related to key values of the same key type and the corresponding key-value pairs have a total invocation frequency greater than the predetermined frequency threshold.

A sixth feature, combinable with any of the previous or following features, wherein the one or more key value intervals are related to key values of one or more key types and the corresponding key-value pairs have a total invocation frequency greater than the predetermined frequency threshold.

A seventh feature, combinable with any of the previous or following features, further comprising: mapping non-hot key-value pairs to intermediate key-value pairs when the non-hot key-value pairs are called by the service system; and reducing the intermediate key-value pairs to resultant key-value pairs.

In a third implementation, a computer-implemented system, comprising: selecting a first number of candidate key-value pairs from input key-value pairs stored in a distributed file system; identifying an invocation frequency for each of the first number of candidate key-value pairs in a predetermined period of time, wherein the invocation frequency is a number of times the corresponding candidate key-value pair was called by a service system in the predetermined period of time; selecting a second number of hot key-value pairs from the candidate key-value pairs based on the invocation frequencies of the candidate key-value pairs; mapping the second number of hot key-value pairs to intermediate key-value pairs; and reducing the intermediate key-value pairs to resultant key-value pairs to be called by the service system.

The foregoing and other described implementations can each, optionally, include one or more of the following features:

A first feature, combinable with any of the following features, wherein the first number of candidate key-value pairs is randomly selected from the input key-value pairs.

A second feature, combinable with any of the previous or following features, wherein selecting a first number of candidate key-value pairs further comprises: determining a service type of a service provided by the service system; determining one or more key types based on the service type; and selecting key-value pairs with the determined one or more key types as the first number of candidate key-value pairs.

A third feature, combinable with any of the previous or following features, wherein selecting a second number of hot key-value pairs further comprises: sorting the candidate key-value pairs based on their corresponding invocation frequencies; and selecting the second number of hot key-value pairs based on the sorted candidate key-value pairs that have invocation frequencies higher than a predetermined threshold.

A fourth feature, combinable with any of the previous or following features, wherein selecting a second number of hot key-value pairs further comprises: determining a distribution of the invocation frequencies of the candidate key-value pairs; determining one or more key value intervals as filtering conditions for selecting the hot key-value pairs based on a predetermined frequency threshold; and selecting candidate key-value pairs with key values within the key value interval as hot key-value pairs.

A fifth feature, combinable with any of the previous or following features, wherein the one or more key value intervals are related to key values of the same key type and the corresponding key-value pairs have a total invocation frequency greater than the predetermined frequency threshold.

A sixth feature, combinable with any of the previous or following features, wherein the one or more key value intervals are related to key values of one or more key types and the corresponding key-value pairs have a total invocation frequency greater than the predetermined frequency threshold.

A seventh feature, combinable with any of the previous or following features, further comprising: mapping non-hot key-value pairs to intermediate key-value pairs when the non-hot key-value pairs are called by the service system; and reducing the intermediate key-value pairs to resultant key-value pairs Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
   identifying an invocation frequency for each of a first number of candidate key-value pairs in a predetermined period of time, wherein the invocation frequency is a number of times the corresponding candidate key-value pair was called by a service system in the predetermined period of time;
   selecting a second number of hot key-value pairs from the candidate key-value pairs, wherein the hot key-value pairs comprise at least one of: candidate key-value pairs that have invocation frequencies higher than a predetermined threshold, or candidate key-value pairs with key values within a key value interval;
   mapping, as intermediate key-value pairs, the second number of hot key-value pairs; and
   reducing, as resultant key-value pairs, the intermediate key-value pairs, wherein the resultant key-value pairs are to be called by the service system.
2. The computer-implemented method of claim 1, wherein the first number of candidate key-value pairs is randomly selected from input key-value pairs stored in a distributed file system.
3. The computer-implemented method of claim 1, further comprising:
   determining a service type of a service provided by the service system;

determining one or more key types based on the service type; and selecting key-value pairs with the one or more key types as the first number of candidate key-value pairs.

4. The computer-implemented method of claim 1, wherein selecting a second number of hot key-value pairs further comprises:

sorting the candidate key-value pairs based on their corresponding invocation frequencies; and selecting the second number of hot key-value pairs based on the sorted candidate key-value pairs that have invocation frequencies higher than a predetermined threshold.

5. The computer-implemented method of claim 1, wherein selecting a second number of hot key-value pairs further comprises:

determining a distribution of invocation frequencies of the candidate key-value pairs;

determining one or more key value intervals as filtering conditions for selecting the hot key-value pairs based on a predetermined frequency threshold; and selecting candidate key-value pairs with key values within the one or more key value intervals as hot key-value pairs.

6. The computer-implemented method of claim 5, wherein the one or more key value intervals are related to key values of the same key type, and wherein corresponding key-value pairs within the one or more key value intervals have a total invocation frequency greater than the predetermined frequency threshold.

7. The computer-implemented method of claim 5, wherein the one or more key value intervals are related to key values of one or more key types, and wherein corresponding key-value pairs within the one or more key value intervals have a total invocation frequency greater than the predetermined frequency threshold.

8. The computer-implemented method of claim 1, further comprising:

mapping non-hot key-value pairs to intermediate key-value pairs when the non-hot key-value pairs are called by the service system; and reducing the intermediate key-value pairs to resultant key-value pairs.

9. A non-transitory, computer-readable medium storing one or more instructions executable by a computer system to perform operations comprising:

identifying an invocation frequency for each of a first number of candidate key-value pairs in a predetermined period of time, wherein the invocation frequency is a number of times the corresponding candidate key-value pair was called by a service system in the predetermined period of time;

selecting a second number of hot key-value pairs from the candidate key-value pairs, wherein the hot key-value pairs comprise at least one of: candidate key-value pairs that have invocation frequencies higher than a predetermined threshold, or candidate key-value pairs with key values within a key value interval;

mapping, as intermediate key-value pairs, the second number of hot key-value pairs; and reducing, as resultant key-value pairs, the intermediate key-value pairs, wherein the resultant key-value pairs are to be called by the service system.

10. The non-transitory, computer-readable medium of claim 9, wherein the first number of candidate key-value pairs is randomly selected from input key-value pairs stored in a distributed file system.

11. The non-transitory, computer-readable medium of claim 9, wherein the operations further comprise:

determining a service type of a service provided by the service system;

determining one or more key types based on the service type; and selecting key-value pairs with the one or more key types as the first number of candidate key-value pairs.

12. The non-transitory, computer-readable medium of claim 9, wherein selecting a second number of hot key-value pairs further comprises:

sorting the candidate key-value pairs based on their corresponding invocation frequencies; and selecting the second number of hot key-value pairs based on the sorted candidate key-value pairs that have invocation frequencies higher than a predetermined threshold.

13. The non-transitory, computer-readable medium of claim 9, wherein selecting a second number of hot key-value pairs further comprises:

determining a distribution of invocation frequencies of the candidate key-value pairs;

determining one or more key value intervals as filtering conditions for selecting the hot key-value pairs based on a predetermined frequency threshold; and selecting candidate key-value pairs with key values within the one or more key value intervals as hot key-value pairs.

14. The non-transitory, computer-readable medium of claim 13, wherein the one or more key value intervals are related to key values of the same key type, and wherein corresponding key-value pairs within the one or more key value intervals have a total invocation frequency greater than the predetermined frequency threshold.

15. The non-transitory, computer-readable medium of claim 13, wherein the one or more key value intervals are related to key values of one or more key types, and wherein corresponding key-value pairs within the one or more key value intervals have a total invocation frequency greater than the predetermined frequency threshold.

16. The non-transitory, computer-readable medium of claim 9, wherein the operations further comprise:

mapping non-hot key-value pairs to intermediate key-value pairs when the non-hot key-value pairs are called by the service system; and reducing the intermediate key-value pairs to resultant key-value pairs.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying an invocation frequency for each of a first number of candidate key-value pairs in a predetermined period of time, wherein the invocation frequency is a number of times the corresponding candidate key-value pair was called by a service system in the predetermined period of time;

selecting a second number of hot key-value pairs from the candidate key-value pairs, wherein the hot key-value pairs comprise at least one of: candidate key-value pairs that have invocation frequencies higher than a predetermined threshold, or candidate key-value pairs with key values within a key value interval;

mapping, as intermediate key-value pairs, the second number of hot key-value pairs; and reducing, as resultant key-value pairs, the intermediate key-value pairs, wherein the resultant key-value pairs are to be called by the service system.

18. The computer-implemented system of claim 17, wherein the first number of candidate key-value pairs is randomly selected from input key-value pairs stored in a distributed file system.

19. The computer-implemented system of claim 17, wherein the operations further comprise:

determining a service type of a service provided by the service system;

determining one or more key types based on the service type; and selecting key-value pairs with the one or more key types as the first number of candidate key-value pairs.

20. The computer-implemented system of claim 17, wherein selecting a second number of hot key-value pairs further comprises:

sorting the candidate key-value pairs based on their corresponding invocation frequencies; and selecting the second number of hot key-value pairs based on the sorted candidate key-value pairs that have invocation frequencies higher than a predetermined threshold.

* * * * *